July 18, 1933.  K. SCHMIDT  1,919,171

COLLAPSIBLE RIM

Filed Dec. 5, 1928

Inventor
Karl Schmidt
By Blackmore, Spencer & Hub
Attorney

Patented July 18, 1933

1,919,171

UNITED STATES PATENT OFFICE

KARL SCHMIDT, OF DETROIT, MICHIGAN, ASSIGNOR, BY MESNE ASSIGNMENTS, TO KELSEY-HAYES WHEEL CORPORATION, A CORPORATION OF NEW YORK

COLLAPSIBLE RIM

Application filed December 5, 1928. Serial No. 323,899.

This invention relates to rims and has particular reference to the rims used for mounting pneumatic tires of automotive vehicles. The invention is particularly concerned with a means for uniting the split ends of the rim.

In prior constructions it has been customary to provide a means at the split in the rim to hold the rim in tire retaining position which means usually comprises an element to rigidly retain the holding means in engagement and prevent its being unlocked or broken. It is the object of the present invention to construct a locking or holding means which will hold the rim ends securely together and at the same time will have no element which of itself will prevent the breaking or unloosening of the connecting means. To rigidly hold the connecting or joining means together when in applied position, use is made of one of the bolts which are used to hold the clamps which secure the rim to the wheel felloe.

The invention comprises a pair of pivoted holding or clamping elements, one united to each end of the split rim. The elements in turn are pivoted to each other and in their locked or tire retaining position have overlapping portions. One of the clamping members is provided with a projecting portion which enters into an opening formed by adjacent recesses in each end of the split portion of the rim. The other member is provided with a recess below which the end of the first mentioned clamping member fits. The bolt for securing the clamping lug fits into the recess and holds the parts rigidly in position and prevents the clamping members from breaking and thereby prevents the contraction of the rim.

Figure 1:
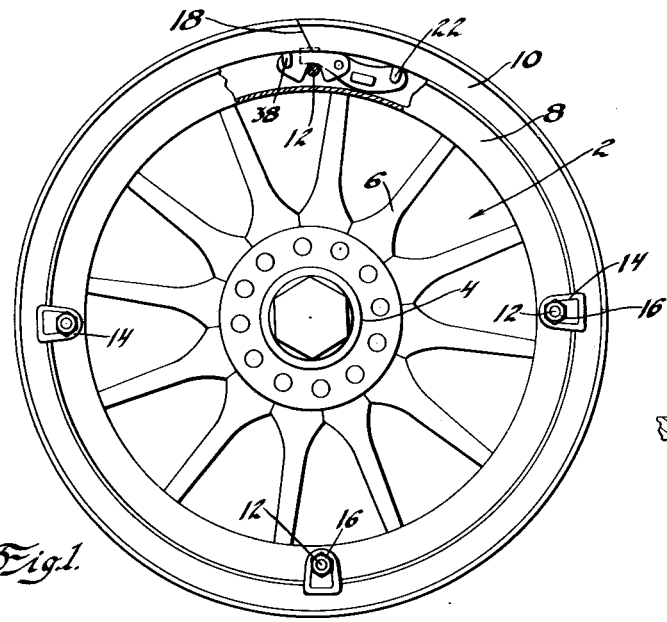
Fig. 1 is a side view of the wheel of an automotive vehicle with parts broken away to show the application of the invention.
Figure 4:
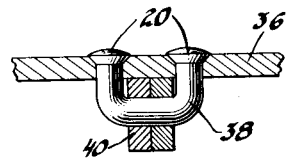
Fig. 4 is a sectional view showing the manner in which the clamping members are pivoted to the rim ends.

Referring to the drawing the numeral 2 indicates the wheel as a whole. The wheel has the hub 4, spokes 6 and channel shaped felloe 8. Over the felloe 8 there is adapted to fit the channel shaped rim 10 which receives the usual tire (not shown). The rim 10 is secured to the felloe 8 by means of bolts 12 over which there are positioned the lugs 14 contacting with both felloe and rim and rigidly held in position by means of the nuts 16. The rim is provided with a split as shown at 18 which is preferably inclined with reference to the radius of the rim.

At one end of the rim there is secured the riveted ends 20 of the U-shaped member 22. Pivoted to the base of the U 22 is a clamping arm or member 24 having a projection 26 at its end. This projection is adapted to fit into an opening 28 formed by the recess 30 in the rim end 32 and the mating recess 34 on the rim end 36.

Pivoted to the rim end 36 by means of a U-shaped member 38 (in all respects similar to the U-shaped member 22) is a second clamping arm or member 40 having the recess or notch 42 intermediate its ends and pivoted as at 44 at its end to an intermediate portion of the clamping arm or member 24.

Figure 2:
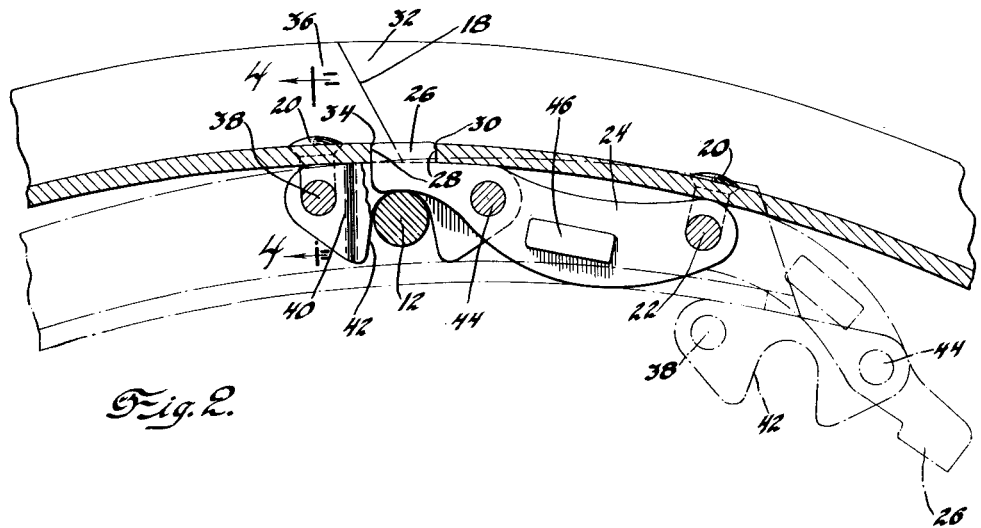
Fig. 2 is an enlarged detail view of the rim at the split, the parts being shown in dotted outline in the contracted position.
Figure 3:
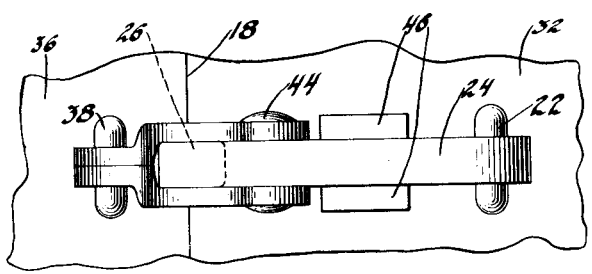
Fig. 3 is a plan view of the parts of the invention shown from the inside of the rim.

The arm or clamping member 24 is provided with a suitable projection or lug 46 at both sides to permit the application of a tool in order to break the connection, or to change the position of the parts from the solid line shown in Fig. 2 to the dotted line position. Instead of the projection 46 the clamping member 24 may be provided with a suitable opening.

By referring to Fig. 2 it will be seen that the clamping members 24 and 40 have no means on the rim to hold them in the full line position. When the rim is removed it is only necessary to apply a tool to the projection 46 and spring the member 24 outwardly which will cause the member 40 to likewise turn on its pivot due to the interconnection at 44. When the parts are in the full line position shown in Fig. 2 and are applied on the felloe 8 of the wheel, or in tire retaining position, the recess 42 is adapted to fit over one of the bolts 12 and the bolt in turn rests against the end of the clamping arm 24 over the projection 26 to thereby rigidly hold the parts in the locked position and positively prevent their release or break to assume the dotted line position of Fig. 2.

I claim:

1. In a transversely split rim having registering recesses in adjacent ends thereof, a securing member hinged to the rim adjacent the split, a projection on said member adapted to project into the recesses aforesaid in said rim, and a second securing member hinged to the rim and to said first securing member.

2. In a transversely split rim having registering recesses in adjacent ends, a securing member hinged to the rim adjacent the split, a projection on said member adapted to project into the recesses aforesaid in said rim, and a second securing member pivoted to the rim and pivoted to said first named member between the said projection and pivotal point of said first named member.

3. A split tire carrying rim adapted to be mounted upon a wheel, comprising a member secured to one end of the rim and extending across the split in the latter for engagement with the opposite end of the same, a second member having one end portion pivotally connected to the rim at the end opposite the first mentioned end and being pivotally connected to the free end of the first-mentioned member, an extension upon the portion of said second member extending beyond the pivotal connection between the two members and engageable with shoulders at the free ends of the rim to position the latter ends relative to each other.

4. A split tire carrying rim adapted to be mounted upon a wheel, comprising a member having one end pivotally connected to the rim adjacent the split in the latter and having the opposite end overlapping the ends of the rim, a second member having one end portion pivotally connected to the rim at the side of the split opposite the side to which the first-mentioned member is connected and having another portion pivotally connected to the free end of said first-mentioned member, and a projection upon the latter portion of the second member extending beyond the pivotal connection between said members and engageable with shoulders at the free ends of the rim for positioning the same relative to each other, said first-mentioned member having a recess therein opposite the projection aforesaid on said second member for receiving a fixed part of the wheel to form anticreep driving means between the rim and the wheel and to maintain the projection in operative relation with the adjacent ends of the rim.

5. A split tire carrying rim fashioned to be mounted upon a wheel and comprising, a pair of members hinged to the rim at opposite sides of the split, a pivotal connection between said members, one end of one of said members extending beyond the pivotal connection and engageable with spaced shoulders formed on the free ends of the rim to position the latter relative to each other, the other of said members having a recess therein opposite the extension aforesaid for receiving a fixed part of the wheel.

6. A split tire carrying rim fashioned to be mounted upon a wheel and comprising spaced shoulders formed on the free ends of the rim, a pair of members hinged to the rim at opposite sides of the split, one end of one of said members fashioned for engagement with the shoulders aforesaid to position the free ends of the rim relative to each other, and means pivotally connecting the other of said members to the member aforesaid intermediate the ends of the latter including a pivot arranged to extend beyond a straight line passing through the axes of the hinge connections between the members and rim for locking the above-mentioned end of the first-named member in operative relation to the aforesaid shoulders.

7. In a transversely split tire carrying rim having registering shoulders on adjacent ends thereof, means for securing the ends aforesaid of the rim together including a pair of members pivotally connected to the rim at opposite sides of the split, a pivotal connection between said members, and an extension on one of said members projecting beyond the pivotal connection therebetween for engaging the shoulders aforesaid on the ends of the rim to accurately position the same relative to each other.

KARL SCHMIDT.